Patented Sept. 6, 1949

2,480,970

UNITED STATES PATENT OFFICE 2,480,970

PHTHALEIN-ALDEHYDE ION-EXCHANGE RESINS AND METHOD OF PREPARING SAME

Stanley P. Rowland, Philadelphia, Pa., assignor to Rohm & Haas Company, Philadelphia, Pa., a corporation of Delaware No Drawing. Application July 30, 1946, Serial No. 687,229

4 Claims. (Cl. 260—57)

This invention relates to resinous compositions which are insoluble in aqueous solutions of acids, bases, and salts, and which are suitable for sorbing cations from fluids. More specifically, this invention concerns the preparation and use of cation-exchange resinous compositions comprising the insoluble, infusible reaction products of a phthalein and formaldehyde.

These compositions are prepared by reacting formaldehyde under controlled conditions with a phthalein in the form of a water-soluble salt to form a resinous gel which is then heated and cured under controlled conditions to yield a dry, thermoset, hard, infusible, and insoluble resin which may then be converted to the hydrogen form if desired.

In the preferred process a phthalein, such as phenol-phthalein, is first prepared by well-known methods. For example, phenol and phthalic anhydride are heated and reacted in the presence of sulfuric acid. Thereafter, the sulfuric acid is neutralized with a strong base such as sodium hydroxide; and the phenolphthalein is converted into a water-soluble salt, such as the salt of sodium. The water-soluble salt, in aqueous solution, is then heated and condensed with formaldehyde, preferably at refluxing temperatures. It is believed that the molecules of the phthalein are thereby joined into larger molecules or polymers by means of methylene bridges. The course of the condensation can be followed by viscosity determinations. Ultimately, the reaction mixture is converted into a gel. Although gel formation may be effected in the reaction vessel, it is more convenient to transfer the reaction mixture to shallow trays prior to gel formation and permit gel formation to take place therein. When a gel is formed, the entire reaction mixure has the appearance of a uniform jelly-like mass. This gel is then dried and heated until the resin is converted to the insoluble-infusible stage. Passage through the gel stage is a critical factor in the production of a product that is porous and thus has an extremely large area for contact with fluids. The product is obtained as a dry, hard, friable, porous or sponge-like mass of cured, insoluble, infusible resin which is preferably broken into particles having the required size for use in treating fluids. The resin may be converted into the hydrogen form by washing with an aqueous solution of a strong mineral acid. During this washing with acid, the cation of the resin is liberated and is replaced by hydrogen.

In the preparation of the phthalein, it is preferred to use phenol itself due to its availability and reactivity. Meta-cresol, 3,5-dimethylphenol, and resorcinol may also be used though, perhaps, less advantageously. All of these phenols have a sufficient number of reactive positions available for reactivity with phthalic anhydride and later with formaldehyde to yield a thermoset product.

Modifications of the method described for preparing the phthalein are well-known. Thus, for example, phosphoric acid or zinc chloride may be used in place of the sulfuric acid. Sulfuric acid is preferred in that the final ion-exchange resin made from a phthalein prepared in this manner has higher capacity. The increased capacity may be due to the presence of sulfonic acid groups in the phthalein made in the presence of sulfuric acid.

The condensation of the formaldehyde and the phthalein in the form of a water-soluble salt is carried out in solution in order to obtain a gel which is later dried to a sponge-like resinous mass. Because the physical properties of the final insoluble and infusible product are quite as important as the chemical composition, it is important that the condensation product go through the gel stage prior to being cured. Otherwise, the desired physical properties are not attained. Condensation is carried out under the influence of heat; and refluxing temperatures are especially suitable. The amount of formaldehyde which is employed should be from about 2.0 to about 4.0 mols per mole of phthalein. In most instances an upper limit of 3.0 mols is preferred.

The drying and curing of the resinous gel is conducted preferably at temperatures from about 75° C. to about 150° C. Higher temperatures may be used but always with the attendant danger of partially decomposing the resin. At temperatures below 75° C. the drying period is unnecessarily long and the resin may not be completely cured. A reduction of pressure accelerates drying.

The following examples illustrate processes for making products within the purview of this invention:

Example 1

Into a three-necked flask, equipped with thermometer, mechanical stirrer and reflux condenser, was placed 148 g. (1.0 mol) of phthalic anhydride, 282 g. (3.0 mols) of phenol, and 116 g. of concentrated sulfuric acid. The mixture was stirred and heated to 115° C. and maintained at 115°–120° C. for nine hours. At this point 360 grams of a 44.5% aqueous solution of sodium hydroxide was slowly added and the temperature was raised to 85°–90° C. Over a period of about 20 minutes, 610 g. of a 37% aqueous solution of formaldehyde was run into the mixture. Agitation and heating at 85°–90° C. was continued for five hours. The contents of the flask were poured into shallow pans and heated first for three hours at 100° C., during which a gel formed, and then for 15 hours at 115° C. The product was a reddish, hard, water- and alkali-insoluble sponge-like mass which was easily broken into small particles. It was converted into the hydrogen form by washing with a 4.5% hydrochloric acid solution followed by several rinses with distilled water. It was crushed and screened to a mesh size of −20 to +40. When placed in a one-inch, vertical ion-exchange column and tested for cation-adsorbing properties, it was found to have an average capacity of five milliequivalents of sodium bicarbonate per gram of resin.

*Example 2*

By the method described in Example 1, 148 g. (1 mol) of phthalic anhydride, 188 g. (2 mols) of phenol, and 118 g. of concentrated sulfuric acid were mixed, stirred, heated to 115° C., and maintained at this temperature for nine hours. A total of 352 g. of a 43% aqueous solution of sodium hydroxide was then added and the temperature was raised to 85°–90° C. At this point 405 g. of a 37% aqueous solution of formaldehyde was slowly added and the resultant mixture was maintained at 85°–90° C. for five hours. The contents of the flask was poured into shallow pans and heated for 15 hours at 100° C. during which a gel formed and the gelled mass dried. This mass was subsequently heated for 8½ hours at 125° C., 8½ hours at 135° C., and finally for 8 hours at 150° C. It was then washed, rinsed, crushed, screened, and tested as in Example 1 and was found to have an average capacity of 7.43 milliequivalents of sodium bicarbonate per gram of resin.

*Example 3*

In this example the procedure of Example 2 was followed and the same reactants and ratios thereof were employed with one exception; namely, that 115 grams of 85% phosphoric acid was used instead of the 188 g. of sulfuric acid of Example 2. The capacity of the resin so prepared was 2.2 milliequivalents of sodium bicarbonate per gram.

In the above examples the resins were given an acid wash which converted them from the salt to the acid or hydrogen form. This conversion is not always necessary; and the resins, in their original salt forms, may be used in many operations. Whether in the acid form or salt form, the products of this invention will adsorb cations from solutions when brought in contact therewith. After becoming saturated with the adsorbed cations the resins may be regenerated to their original form by being washed with a solution of an acid or a salt. This ability to be used repeatedly for cation-adsorption and to be repeatedly regenerated is an important advantage.

The products described herein have high capacity for cations. This high capacity results from both the chemical composition of the resins and their porous structure. The resins may be modified, if desired, by extenders, fillers, or carriers such as silica, alumina, starch, wood flour, or the like which may be mechanically mixed with the crushed resinous product or added to the resin during its condensation and prior to its forming a gel. Such modifying materials do not detract from the cation-sorbing efficiency of the resin component per se.

I claim:

1. A process for the preparation of insoluble cation-exchange resins which comprises condensing by heating two moles of a phenol from the class consisting of hydroxybenzene, m-cresol, 3,5-dimethylphenol, and resorcinol with one mole of phthalic anhydride in the presence of sulfuric acid, neutralizing the resultant reaction mixture with a strong base, then condensing in aqueous solution under the influence of heat formaldehyde and said neutralized reaction product in the ratio of 2 to 4 moles of formaldehyde for each mole of phenol in said reaction product, continuing the condensation until a gel is formed, drying and heating said gel until it is converted into a porous mass of insoluble, infusible resin, washing said resin with dilute mineral acid, and converting said resin into the hydrogen form.

2. A process for the preparation of insoluble cation-exchange resins which comprises condensing by heating two moles of phenol with one mole of phthalic anhydride in the presence of sulfuric acid, neutralizing the resultant reaction mixture with a strong base, then condensing in aqueous solution under the influence of heat formaldehyde and said neutralized reaction product in the ratio of 2 to 4 moles of formaldehyde for each mole of phenol in said reaction product, continuing the condensation until a gel is formed, drying and heating said gel until it is converted into a porous mass of insoluble, infusible resin, washing said resin with dilute mineral acid, and converting said resin into the hydrogen form.

3. A cation-exchange resin which comprises a heat-converted, insoluble, infusible condensate prepared by condensing by heating two moles of a phenol from the class consisting of hydroxybenzene, m-cresol, 3,5-dimethylphenol, and resorcinol with one mole of phthalic anhydride in the presence of sulfuric acid, neutralizing the resultant reaction mixture with a strong base, then condensing in aqueous solution under the influence of heat formaldehyde and said neutralized reaction product in the ratio of 2 to 4 moles of formaldehyde for each mole of phenol in said reaction product, continuing the condensation until a gel is formed, drying and heating said gel until it is converted into a porous mass of insoluble, infusible resin, washing said resin with dilute mineral acid, and converting said resin into the hydrogen form.

4. A cation-exchange resin which comprises a heat-converted, insoluble, infusible condensate prepared by condensing by heating two moles of phenol with one mole of phthalic anhydride in the presence of sulfuric acid, neutralizing the resultant reaction mixture with a strong base, then condensing in aqueous solution under the influence of heat formaldehyde and said neutralized reaction product in the ratio of 2 to 4 moles of formaldehyde for each mole of phenol in said reaction product, continuing the condensation until a gel is formed, drying and heating said gel until it is converted into a porous mass of insoluble, infusible resin, washing said resin with dilute mineral acid, and converting said resin into the hydrogen form.

STANLEY P. ROWLAND.

REFERENCES CITED

The following references are of record in the file of this patent:

UNITED STATES PATENTS

| Number | Name | Date |
|---|---|---|
| 2,027,337 | Heck | Jan. 7, 1936 |
| 2,373,548 | D'Alelio | Apr. 10, 1945 |

FOREIGN PATENTS

| Number | Country | Date |
|---|---|---|
| 192,590 | Belgium | June 15, 1906 |